April 20, 1971  M. A. MELNIKOV-EIKHENVALD ET AL  3,575,839
ELECTROLYZER WITH SOLID ELECTRODES
Filed Feb. 15, 1968
3 Sheets-Sheet 1

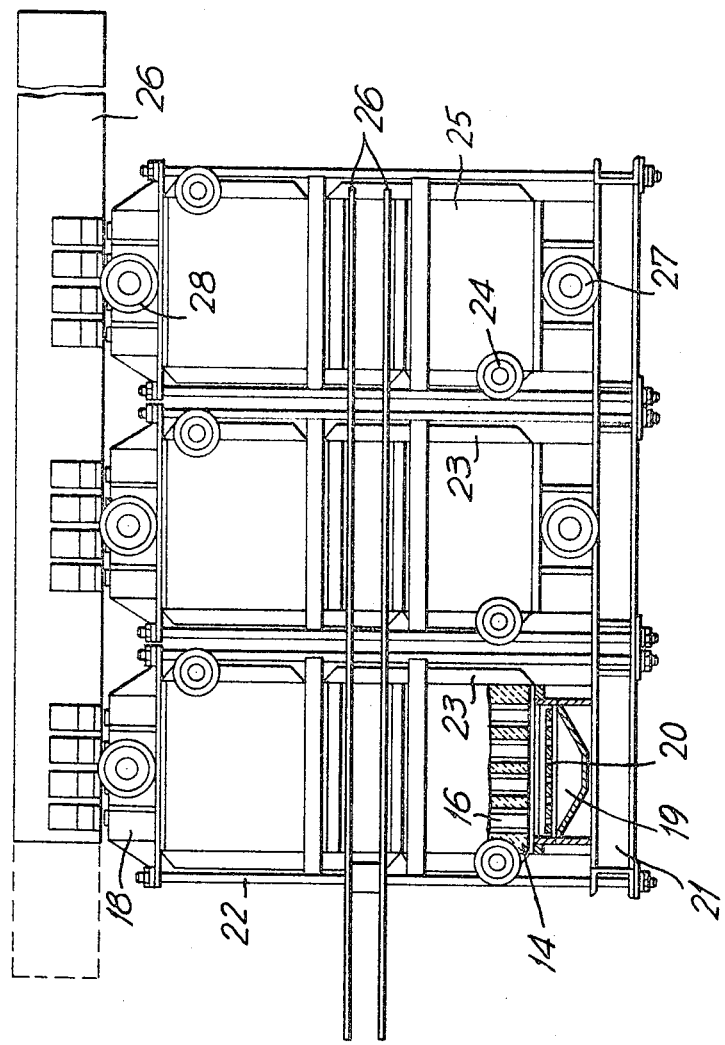

United States Patent Office 3,575,839
Patented Apr. 20, 1971

3,575,839
ELECTROLYZER WITH SOLID ELECTRODES
Mikhail Alexeevich Melnikov-Eikhenvald, Ul. Vavilova 10, korp. 20, kv. 18; Georgy Mikirtychevich Kamarian, Vorontsovskaya ul. 30b, kv. 18; Alexandr Kuzmich Nesterkin, Sovetskaya ul. 5, kv. 22; Vladimir Nikolaevich Suchkov, Ul. Marii Ulyanivoi 16, korp. 1, kv. 53; Vadim Ippolitovich Djumulen, Ul. Petra Romanova 5, kv. 8; Andrei Petrovich Tomilov, 5 Parkovaya ul. 56, korp. 6, kv. 59; and Semen Lvovich Varshavsky, 7 ul. Pavla Andreeva 28, kv. 282, all of Moscow, U.S.S.R.
Filed Feb. 15, 1968, Ser. No. 705,677
Int. Cl. B01k *3/00, 3/04*
U.S. Cl. 204—272                    4 Claims

ABSTRACT OF THE DISCLOSURE

An electrolyzer is disclosed for the forced flow of an electrolyte therethrough and the electrolyzer comprises a unitary block constituting one electrode and having openings therein, the electrodes of opposite polarity being inserted with clearance in the openings to form interelectrode gaps between the electrodes. An electrolyte is circulated from an inlet of the block to an outlet thereof and passes through the electrode gaps. Grids are provided between the electrodes and the inlet and outlet respectively to distribute the electrolyte in the interelectrode gaps. Partitions permeable to electrolyte are positioned in the interelectrode gaps and have lateral projections to agitate electrolyte during its flow through the interelectrode gaps. The block has passages for the flow of a heat exchange fluid therethrough and these passages are isolated from the openings.

---

The present invention relates to the field of electrochemistry and more particularly to electrolyzes suitable for operation with heterogeneous, readily demulsified electrolytes such as that employed to yield adiponitrile.

Electrolyzers with solid electrodes are widely known, said electrolyzers being adapted, in particular, for effecting forced circulation of electrolyte therein, various solutions being made use of by said electrolyzers as electrolyzer.

However, the known electrolyzers fail to effect electrolysis of heterogeneous media such as unstable emulsions, since the latter are liable to demulsification which involves disturbance of the electrochemical process and, in some cases, results in failure of the electrodes.

To prevent demulsification of readily demulsified mixtures occurring in the conventional-design electrolyzers, substantially high circulation velocities of electrolyte are required which results in an extreme increase of the pumping unit both in power and in size thereof.

Moreover, another disadvantage inherent in the conventional-type electrolyzers resides in the presence of free passageways for electrolyte to flow apart from the interelectrode gaps provided for the purposes, which fact leads to a decreased circulation velocity of electrolyte flowing near the electrodes and in irregular velocities of the electrolyte flowing through various sections of the electrolyzers.

One more disadvantage of the known electrolyzers is that at the inlet and outlet of the electrolyzer electrolye stagnation occurs and stirring of the electrolye is effected only by virtue of diffusion and insignificant convective flows.

Because of all the disadvantages mentioned above, the electrolysis of readily demulsified mixtures effected in the conventional-type electrolyzers, even with the employment of high-power pumping units fails to prevent electrolyte demulsification, which, in turn, results in disturbing the entire electrochemical process.

It is an object of the present invention to provide an electrolyzer that is free from the effect of electrolyte demulsification.

It is another object of the present invention to provide an electrolyzer, wherein an additional emulsification of the circulating electrolyte take place, thereby rendering it possible to electrolyze readily demulsified media by using a pumping unit featuring a substantially decreased power and reduced size thereof.

In keeping with the aforesaid and other objects, the herein-disclosed electrolyzer with solid electrodes adapted for a forced electrolyte circulation therein, features, according to the present invention, electrodes so shaped and arranged that the effective flow area of electrolyte in the electrolyzer is not in excess of the cross-sectional area of the interelectrode gaps therein by more than 50 percent, provision being made at the inlet and/or at the outlet for electrolyte for special devices capable of regularly distributing electrolyte flow within the electrolyzer chamber, said devices being formed, for example, as grids.

The herein-disclosed electrolyzer features its cathode (or anode) made essentially as a solid block with openings for insertion of the anodes (or cathodes).

It is expedient for said block to be provided with passageways for passage of a thermostatic liquid, said passageways being so arranged as not to intersect with said openings for the electrodes.

Provision can be made in the interelectrode gaps for partitions permeable to electrolyte and furnished with projections which contribute to make the flow of electrolyte more turbulent.

An embodiment of the present invention will be described hereinbelow by way of example with reference to the accompanying drawings, wherein:

FIG. 4 is an elevation view, partly in section of an electrolyzer composed of three sections or compartments, each having its container and one electrode made as a solid block provided with openings for insertion of the other electrode respectively.

Figure 1:
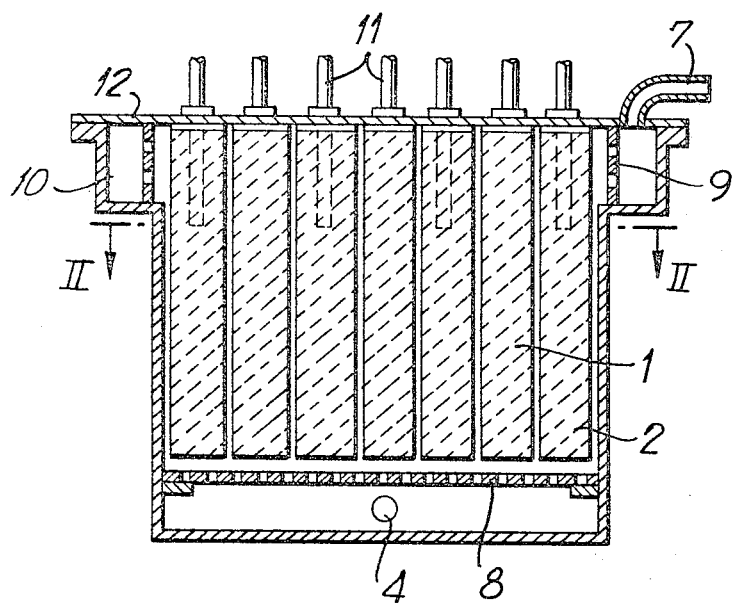
FIG. 1 is a longitudinal section view of the electrolyzer according to the invention.
Figure 2:
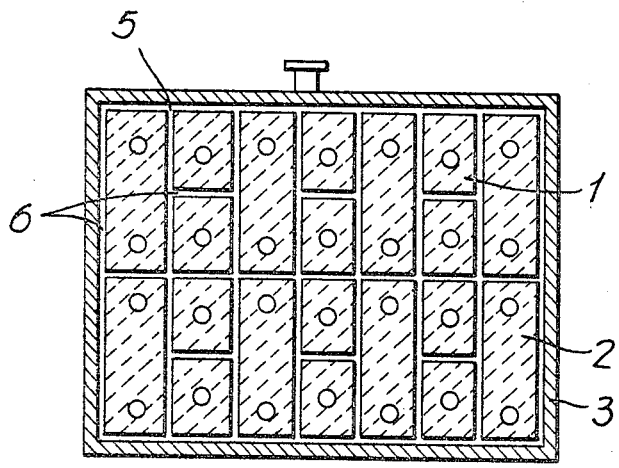
FIG. 2 is a section on the line II—II of FIG. 1.

Now reference being directed first to FIG. 1, the electrolyzer according to the invention consists of the sets of anodes 1 and cathodes 2, both of them being tightly positioned within a shell or casing 3 (FIG. 2). Electrolyte is fed to the electrolyzer through an inlet pipe 4 (FIG. 1) located at the bottom of the casing 3, whereupon, having passed through interelectrode gaps 5 (FIG. 2) and assembling gaps 6, it is discharged in the form of gas-fluid mixture via an outlet pipe 7 (FIG. 1).

Any additional passageways for passage of the fluid adversely affect the functioning of the electrolyzer and result in a sharp increase of the power consumed by the pumping unit.

It is for this reason that no such passageways are available or, at any rate, the area thereof should not be in excess of 50 percent of the total effective area of the interelectrode gaps.

A grid 8 is provided at the bottom of the casing 3 of the electrolyzer below the electrodes but above the electrolyte inlet pipe 4 (FIG. 1).

Another such grid 9 is located at the top of the electrolyzer casing in the path of the gas-fluid mixture and upstream of the outlet pipe 7.

The size of the grid meshes are so selected in dependence with the viscosity and circulation velocity of the mixture that the hydraulic resistance of the grids is greatly in excess of that of the total path between the grids and the path from the pipe 4 to the lower grid 8 and from the upper grid 9 to the pipe 7.

To this end, provision is made in the top portion of the electrolyzer casing 3 for a widening to form an equalization passage 10 past the grid 9.

All the electrodes are secured to a cover 12 by way of terminal posts 11 and insulating bushes with spacers (not shown in the drawing).

Figure 3:
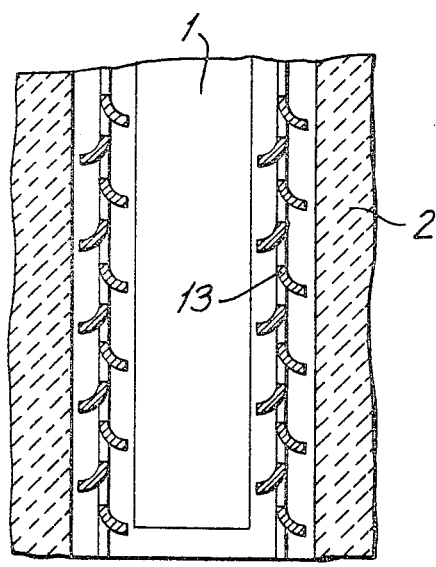
FIG. 3 illustrates the electrolytic cell accommodating a partition provided with projections.

To provide an additional dispersing of the circulating mixture, partitions 13 (FIG. 3) with projections and openings are mounted between the electrodes.

Figure 5:
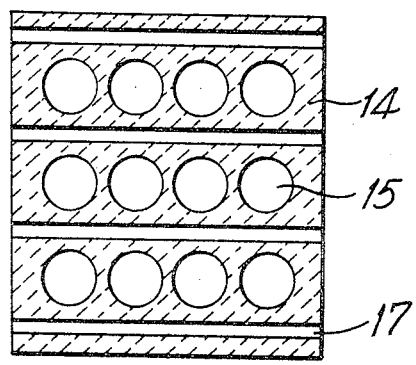
FIG. 5 is a transverse section view through the solid block of FIG. 4.

In order to completely eliminate free passages for the flow of electrolyte except in the interelectrode gaps and to reduce the amount of electrolyte employed, an electrolyzer is preferred, wherein a solid block 14 (FIGS. 4 and 5) is utilized both as a casing or housing and an electrode, e.g. a cathode, said block being made, for example, of graphite or some other material and being provided with openings 15 (FIG. 5) for insertion of anodes 16 (FIG. 4) thereinto. Openings 17 (FIG. 5) not intersecting with the openings 15, i.e. isolated therefrom are provided for the flow of a heat exchange or thermostatic fluid.

The cathode block 14 (FIG. 4) with the anodes 16 mounted therein are fixed to a cover 18, and together with a tray 19 and a grid 20, are mounted on a frame 21 in the form of a stack resting upon rubber gaskets, whereupon it is drawn tight thereto by means of studs 22. The cover 18 supports an upper grid (not shown in the drawing). However, when making use of an electrolyzer of the block-type design, as it can be seen from FIG. 4, only the lower grid 20 can be employed. Drawn tight to the lateral surfaces of the block on rubber gaskets are covers 23 with pipes 24 to form a collector for the accumulation of thermostatic fluid.

The electrolyzer described herein comprises three block-sections 25 (which may be more or less dependent upon the desired load) combined with a common collector (not illustrated in the drawing) to feed the circulating mixture, and a common busbar 26 (FIG. 4).

To make the flow of the mixture along the interelectrode space as high turbulent as possible at low circulation velocities thereof, the partitions 13 (FIG. 3) with openings and projections are provided between the electrodes.

A pipe 27 (FIG. 4) and a pipe 28 are provided respectively in the bottom and in the cover of the electrolyzer, said pipes serving for feeding electrolyte thereto and for bringing the gas-fluid mixture out therefrom, respectively.

The herein-disclosed electrolyzer operates as follows.

The pumping unit (not shown in the drawing) develops a forced circulation of the mixture within a closed circuit through the emulsifier (likewise not shown in the drawing), the electrolyzer (FIG. 4), a phase-separator and a heat-exchanger (both not illustrated in the drawing).

Then the emulsified mixture is fed to the lower pipe 4 or 27 (FIGS. 1, 4) of the electrolyzer. Since the lower grid 8, 20 (FIGS. 1, 4) and the upper grid 9 (FIG. 1), both have a higher hydraulic resistance than all the other sections of the mixture passage from the inlet to the outlet of the electrolyzer, the circulating fluid is uniformly distributed throughout the entire effective area thereof.

An additional emulsification of the mixture occurs by virtue its being forced through many fine holes, as well as due to agitation of its flow by the partitions 13 (FIG. 3) provided with the openings and projections.

The gases evolving in the course of electrolysis travel upwardly with the fluid to form a gas-fluid mixture which then passes through the equalization passage 10 to the pipe 7, 28 (FIGS. 1, 4).

The mixture discharged from the electrolyzer also contains the products of the electrochemical reaction involved.

From the electrolyzer, the mixture passes into the phase-separator, wherein gases are separated from the fluid and the finished product is yielded.

Further on, the mixture goes from the phase-separator to the heat exchanger for being either cooled or heated therein, and therefrom it is fed to the pumping unit again.

When the cooled solid block 14 (FIG. 5) is employed as the casing and cathode of the electrolyzer, no additional heat-exchanger is needed.

Moreover, the required capacity of the pumping unit is reduced due to the smaller amount of the fluid circulating within the entire closed system.

What is claimed is:

1. An electrolyzer for the forced flow of an electrolyte therethrough, said electrolyzer comprising a unitary block constituting one electrode, said block having openings therein, electrodes of opposite polarity of the block inserted with clearance in said openings to form interelectrode gaps between said electrodes, said block having an inlet and an outlet for the flow of electrolyte therethrough via the clearances between the electrdoes, and grids between said inlet and said electrodes and said outlet and said electrodes, said grids having a hydraulic resistance greater than the remainder of the flow path of electrolyte from the inlet to the outlet whereby to distribute the electrolyte in said clearances.

2. An electrolyzer as claimed in claim 1 wherein said block has passages for the flow of a heat exchange fluid, said passages being isolated from said openings.

3. An electrolyte as claimed in claim 1 comprising means in the interelectrode gaps permeable to electrolyte and including projections to agitate electrolyte during its flow through said interelectrode gaps.

4. An electrolyte as claimed in claim 3 wherein said means in the interelectrode gaps comprises partitions in said gaps with said projections extending laterally thereof.

References Cited

UNITED STATES PATENTS

| | | | |
|---|---|---|---|
| 387,467 | 8/1888 | Webster | 204—152 |
| 541,147 | 6/1895 | Blackman | 204—275X |
| 645,419 | 3/1900 | Davis et al. | 204—149 |
| 844,262 | 2/1907 | Dieterich | 204—275X |
| 1,575,627 | 3/1926 | Heinze | 204—284X |
| 1,771,091 | 7/1930 | Lawaczeck | 204—284X |
| 1,862,663 | 6/1932 | Curtis | 204—149 |
| 2,921,894 | 1/1960 | O'Callaghan | 204—284X |
| 3,168,458 | 2/1965 | Sprague | 204—283X |
| 3,375,184 | 3/1968 | Giacopelli | 204—225 |
| 3,404,083 | 10/1968 | Kircher | 204—272 |

TA-HSUNG TUNG, Primary Examiner

A. C. PRESCOTT, Assistant Examiner

U.S. Cl. X.R.

204—275